Oct. 30, 1928. Re. 17,119
C. F. JENKINS
HIGH SPEED CAMERA
Original Filed April 14, 1921
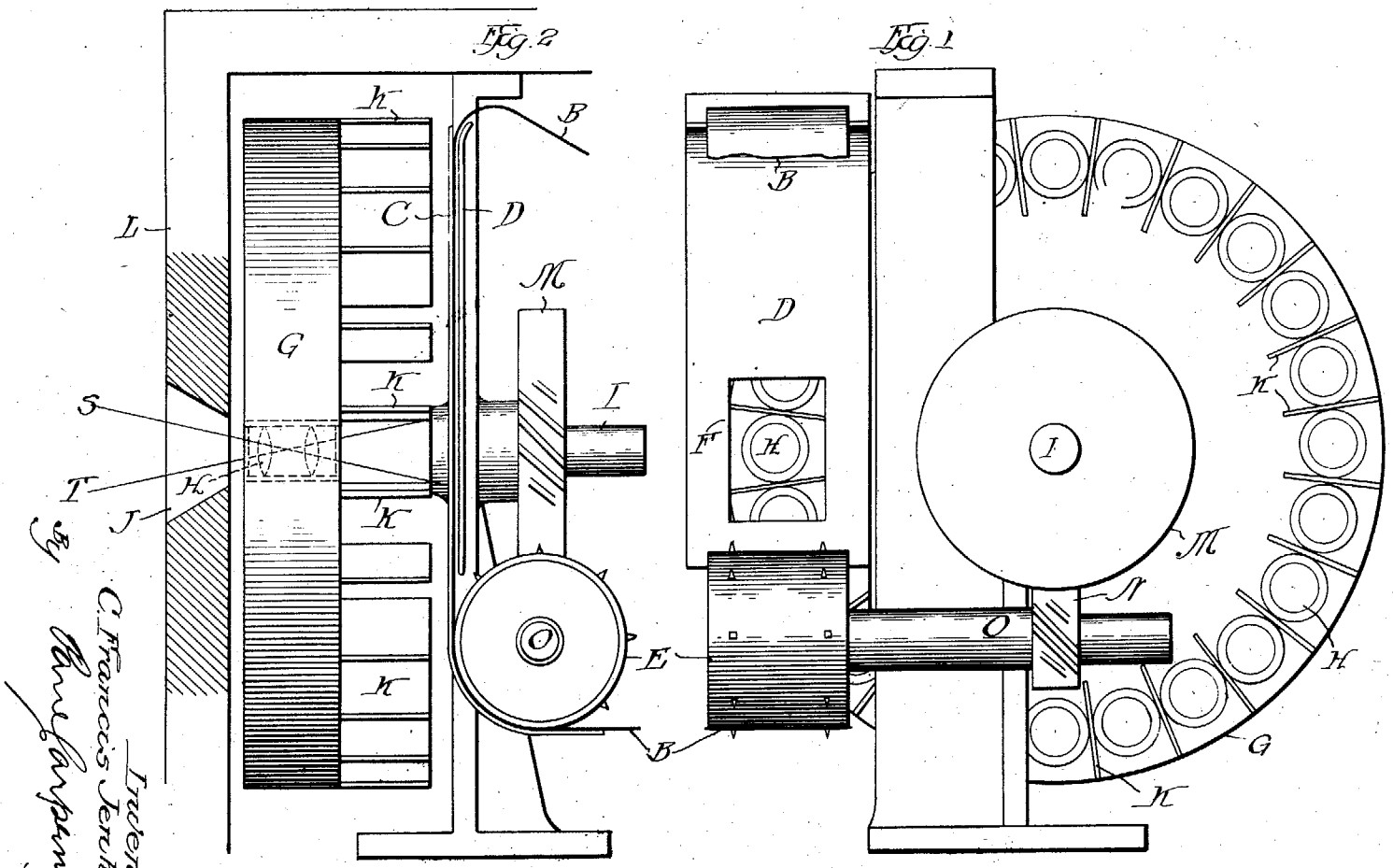
Inventor
C. Francis Jenkins
By Paul Carpenter
Atty.

Reissued Oct. 30, 1928. Re. 17,119

UNITED STATES PATENT OFFICE.

CHARLES FRANCIS JENKINS, OF WASHINGTON, DISTRICT OF COLUMBIA.

HIGH-SPEED CAMERA.

Original No. 1,481,288, dated January 22, 1924, Serial No. 461,427, filed April 14, 1921. Application for reissue filed January 21. 1926. Serial No. 82,760.

Among the objects of this invention is to provide devices for producing motion pictures at a rate many times that until recently considered possible, a rate of 2000 a second having been attained. This rate renders possible analysis of the movement of a body at such high speed that its positions could not heretofore be recorded at desirably short intervals.

The camera of Patent Number 560,800, was provided with a plurality of lenses successively passing an exposure aperture at nearly the rate of a constantly moving sensitized film passing the same aperture, but that camera could not compete commercially with a camera having a single lens and intermittently-moving film. Intermittent motion is satisfactory at 16 exposures per second, but obviously is not available for a hundred times that speed. With multiple, uniform-speed lenses, the limit of speed depends only upon sensitiveness of film, intensity of light, and rapidity of the lenses. In such high speed work, camera cost is of little importance in comparison with the value of extremely short picture intervals. The lenses should work with their greatest aperture and the exposure opening should be wider than in ordinary cameras so as to increase the exposure interval. Provision must be made for preventing overlapping of lens images upon the film, but devices heretofore proposed for such ends have not proved successful at such extreme speeds as are being here considered. Extended experiments have resulted in successfully using a sort of mask between the lenses and the exposure opening.

In the accompanying diagrammatic drawings,

Figure 1 shows an embodiment of my devices in front elevation;

Fig. 2 shows the same in side elevation, a portion of the camera box being shown.

In these views, B represents a sensitized film constantly drawn between plates C, D, and past an exposure opening F by a sprocket drum E, the height of the opening being approximately equal to twice the vertical width of a picture. This increases the amount of light which is permitted at any instant to reach the film, and assures pictures of sharpness and good definition, which in all cameras of this character known to me has been impracticable. The vertical plates C and D which are spaced apart to receive the film are of sufficient length to guide the same without permitting any substantial or material displacement of the film relative to the rotary lens carrier and the film and the lens carrier are thereby adapated to operate accurately at high rates of speed.

In front of the plates C, D, is a rotary lens carrier G, having in its peripheral zone a series of substantially identically similar lenses H, and carried by a shaft I.

Between successive lenses, partitions K are fixed to the carrier and project nearly across the space between the latter and the place C, so that light rays S, T, entering the box L at the aperture J and passing through each lens H arriving at the aperture and thence to the film, cover on the latter no more than a picture's height, while rays which would strike the film at higher or lower points are intercepted by the partitions K. The carrier shaft I bears a gear M which meshes with a pinion N upon the shaft O of the sprocket drum, so that the film and the lenses have, at the exposure point, substantially precisely the same speed without substantial relative displacement. The shafts may be rotated at the desired speed by suitable devices, not shown.

The lens carrier must, of course, be constructed of such nature that, at the high rate of acceleration and speed at which it must move, it has the required strength and yet permits of high rate of acceleration necessary.

By increasing the size of the light aperture and moving the film and lenses substantially without relative displacement at the instant of exposure and masking the light rays from immediately adjacent parts of the film, I am enabled to increase the degree of exposure and employ the ordinary commercial super-speed negative film. Ordinarily, not over ten per cent exposure is obtainable with an intermittently moved film, but I am enabled to get more than one-hundred and fifty per cent exposure of the film, even at rates of speed where thirty-two hundred (3200) pictures per second are made with sixteen (16) pictures per foot of the film.

Obviously, as shown, the disk carrier, its lenses and its radial partitions form a unitary structure, and necessarily move together as if integral. Obviously, too, the gears M, N, being, as shown, of a well-known type without "backlash," or appreciable lost motion, the film and lens-directed light beams move substantially exactly together, as they must to give satisfactory pictures at the extremely high speed mentioned.

Having thus described my invention and illustrated its use, what I claim as new and desire to secure by Letters Patent is:

1. The combination with a camera casing having a light aperture and film feeding devices, of a disk carrier having fixed in its peripheral zone an annular series of duplicate, closely adjacent lenses in position to pass said aperture successively, radial partitions fixed to the carrier, separating each lens from its neighbors and extending substantially to the film, and means for moving the lenses and film at identical speeds across the path of light from said aperture, said carrier, lenses, and partitions moving as if integral.

2. The combination with a camera casing having a light aperture, of a plurality of rotary lenses rotating in a common transverse plane in position to pass said aperture successively, means for moving a film in a plane in parallelism with the said transverse plane and the lenses in substantial synchronism past the light aperture without substantial relative displacement during exposure, and means for interposing a light shield coterminous in operation with each section of film exposure and disposed radially at right angles to the said planes of the film and the lens.

3. The combination with a camera casing having a light aperture, of a plurality of rotary lenses rotating in a common transverse plane in position to pass said aperture successively, means for moving a film and the lenses in parallelism and substantial synchronism past the light aperture without substantial relative displacement during exposure, and means consisting of a light cell extending annularly at right angles to the said transverse plane of the lenses for dividing the film photographically into sections by excluding light from all parts except that to be exposed.

4. The combination with a camera casing having a light aperture and film feeding device, of a disk carrier spaced from and having its side faces in parallelism with the film and having fixed in its peripheral zone an annular series of duplicate, closely adjacent lenses in position to pass said aperture successively, radial partitions fixed to one of the side faces of the disk carrier, separating each lens from its neighbor and extending substantially to the film in the space between the same and the lens carrier, and means for moving the lenses and film at identical speeds across a path of light from said aperture, said carrier, lenses and partitions moving as if integral.

5. In a camera for producing hundreds of motion pictures per second, the combination with a plate having an exposure opening, of means for continually feeding a sensitized film past said opening, a rigid member rotating wholly in front of the said plate in parallelism therewith and having fixed to its peripheral zone a plurality of lenses arranged to pass said opening at the film rate while focusing substantially the said opening, and approximately rigid opaque partitions projecting respectively from said member between each lens and the next succeeding lens and reaching nearly to said plate.

In witness whereof, I have hereunto signed my name.

CHARLES FRANCIS JENKINS.